United States Patent
Walling

(10) Patent No.: US 7,312,537 B1
(45) Date of Patent: Dec. 25, 2007

(54) METHODS AND APPARATUS FOR SUPPLYING AND/OR ABSORBING REACTIVE POWER

(75) Inventor: Reigh Walling, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/424,989

(22) Filed: Jun. 19, 2006

(51) Int. Cl.
*H02P 9/00* (2006.01)
*F03D 7/00* (2006.01)

(52) U.S. Cl. .......................................... 290/44; 290/55
(58) Field of Classification Search ................. 290/44, 290/55
See application file for complete search history.

(56) References Cited

U.S. PATENT DOCUMENTS

| | | | |
|---|---|---|---|
| 4,400,659 A * | 8/1983 | Barron et al. ................ 322/32 |
| 5,083,039 A * | 1/1992 | Richardson et al. ......... 290/44 |
| 6,512,966 B2 | 1/2003 | Lof et al. ................... 700/291 |
| 6,566,764 B2 * | 5/2003 | Rebsdorf et al. ............ 290/44 |
| 6,924,565 B2 * | 8/2005 | Wilkins et al. .............. 290/44 |
| 6,924,991 B2 * | 8/2005 | Skeist et al. ............ 363/21.02 |
| 7,071,579 B2 * | 7/2006 | Erdman et al. .............. 290/55 |
| 7,081,689 B2 * | 7/2006 | Tilscher et al. .............. 290/44 |
| 7,095,128 B2 * | 8/2006 | Canini et al. ................ 290/44 |
| 2003/0071457 A1 * | 4/2003 | Imai .......................... 285/21.1 |
| 2003/0227172 A1 * | 12/2003 | Erdman et al. ............... 290/44 |
| 2005/0200337 A1 * | 9/2005 | Schreiber et al. ........... 323/205 |
| 2006/0113800 A1 * | 6/2006 | Willisch et al. .............. 290/44 |

\* cited by examiner

*Primary Examiner*—Joseph Waks
(74) *Attorney, Agent, or Firm*—James E. McGInness; Armstrong Teasdale LLP

(57) ABSTRACT

A wind turbine includes a rotor having a hub, at least one rotor blade coupled to the hub, and a rotor shaft coupled to said hub for rotation therewith. The wind turbine also includes an electrical generator coupled to the rotor shaft, and a generator-side frequency converter electrically coupled to the electrical generator for converting variable frequency AC received from the electrical generator into DC. The generator-side frequency converter is electrically coupled to an electrical load and is configured to at least one of supply reactive power to the electrical load and absorb reactive power from the electrical load. The wind turbine also includes a grid-side frequency converter electrically coupled to the generator-side frequency converter for converting DC received from the generator-side frequency converter into fixed frequency AC. The grid-side frequency converter is electrically coupled to the electrical load and is configured to at least one of supply reactive power to the electrical load or absorb reactive power from the electrical load.

21 Claims, 4 Drawing Sheets

METHODS AND APPARATUS FOR SUPPLYING AND/OR ABSORBING REACTIVE POWER

BACKGROUND OF THE INVENTION

This invention relates generally to wind turbines, and more specifically to methods and apparatus for supplying and/or absorbing reactive power with respect to wind turbines.

Wind power is sometimes used to generate electrical power using a wind turbine, wherein an electrical generator is driven by the rotation of a rotor that converts the wind power into rotational energy. However, there may sometimes be inadequate wind power to drive the rotor, such that the wind turbine does not generate electrical power.

BRIEF DESCRIPTION OF THE INVENTION

In one aspect, a wind turbine includes a rotor having a hub, at least one rotor blade coupled to the hub, and a rotor shaft coupled to said hub for rotation therewith. The wind turbine also includes an electrical generator coupled to the rotor shaft, and a generator-side frequency converter electrically coupled to the electrical generator for converting variable frequency AC received from the electrical generator into DC. The generator-side frequency converter is electrically coupled to an electrical load and is configured to at least one of supply reactive power to the electrical load and absorb reactive power from the electrical load. The wind turbine also includes a grid-side frequency converter electrically coupled to the generator-side frequency converter for converting DC received from the generator-side frequency converter into fixed frequency AC. The grid-side frequency converter is electrically coupled to the electrical load and is configured to at least one of supply reactive power to the electrical load or absorb reactive power from the electrical load.

In another aspect, a method is provided for providing reactive power with respect to a wind turbine having an electrical generator, a generator-side frequency converter electrically coupled to the electrical generator, and a grid-side frequency converter electrically coupled between the generator-side frequency converter and an electrical load. The method includes simultaneously supplying reactive power to the electrical load using the generator-side frequency converter and the grid-side frequency converter.

In another aspect, a method is provided for providing reactive power with respect to a wind turbine having an electrical generator, a generator-side frequency converter electrically coupled to the electrical generator, and a grid-side frequency converter electrically coupled between the generator-side frequency converter and an electrical load. The method includes simultaneously absorbing reactive power from the electrical load using the generator-side frequency converter and the grid-side frequency converter.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational power from wind power, and more specifically, converts kinetic energy of wind into mechanical energy. As used herein, the term "wind generator" is intended to be representative of any wind turbine that generates electrical power from rotational power generated from wind power, and more specifically, converts mechanical energy converted from kinetic energy of wind to electrical power.

Figure 1:
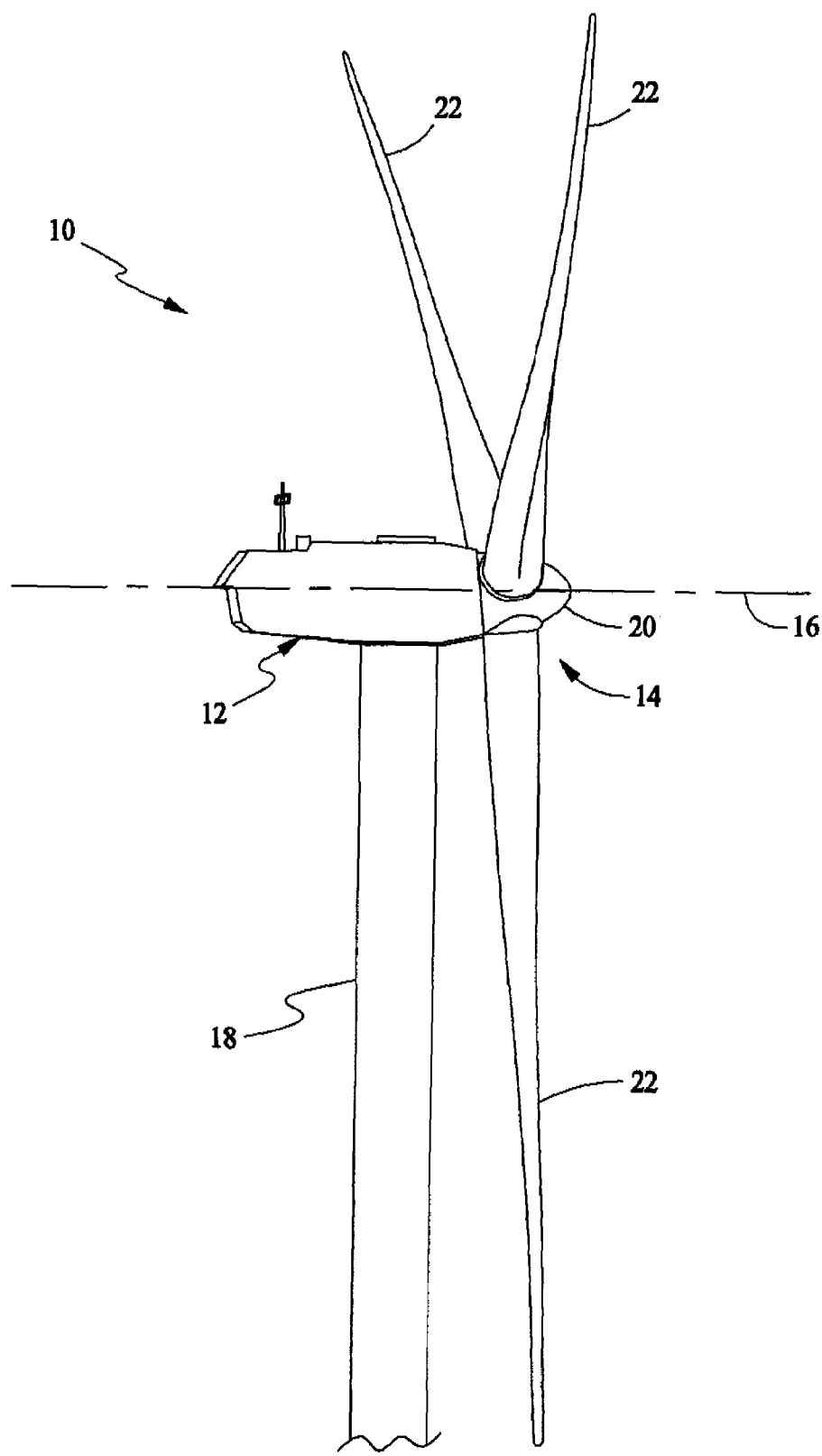
FIG. 1 is a perspective of an exemplary embodiment of an exemplary wind turbine.

FIG. 1 is a perspective of an exemplary embodiment of an exemplary wind turbine 10. Wind turbine 10 described and illustrated herein is a wind generator for generating electrical power from wind power. The exemplary wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 is coupled to an electrical load (not shown in FIG. 1), such as, but not limited to, a power grid, an energy storage device, a hydrogen electrolyzer, and/or an electrical motor, for receiving auxiliary electrical power therefrom and/or for supplying electrical power generated by wind turbine 10 thereto. Although only one wind turbine 10 is illustrated, in some embodiments a plurality of wind turbines 10 may be grouped together, sometimes referred to as a "wind farm".

Wind turbine 10 includes a body 12, sometimes referred to as a "nacelle", and a rotor (generally designated by 14) coupled to body 12 for rotation with respect to body 12 about an axis of rotation 16. In the exemplary embodiment, nacelle 12 is mounted on a tower 18. However, in some embodiments, in addition or alternative to tower-mounted nacelle 12, wind turbine 10 includes a nacelle 12 adjacent the ground and/or a surface of water. The height of tower 18 may be any suitable height enabling wind turbine 10 to function as described herein. Rotor 14 includes a hub 20 and a plurality of blades 22 (sometimes referred to as "airfoils") extending radially outwardly from hub 20 for converting wind power into rotational power. Although rotor 14 is described and illustrated herein as having three blades 22, rotor 14 may have any number of blades 22. Blades 22 may each have any length (whether described herein). For example, in some embodiments one or more rotor blades 22 are about 0.5 meters long, while in some embodiments one or more rotor blades 22 are about 50 meters long. Other examples of blade 22 lengths include 10 meters or less, about 20 meters, about 37 meters, and about 40 meters. Still other examples include rotor blades 22 between about 50 and about 100 meters long.

Despite how rotor blades 22 are illustrated in FIG. 1, rotor 14 may have blades 22 of any shape, and may have blades 22 of any type and/or any configuration, whether such shape, type, and/or configuration is described and/or illustrated herein. One example of another type, shape, and/or configuration of rotor blades 22 is a ducted rotor (not shown) having a turbine (not shown) contained within a duct (not shown).

Another example of another type, shape, and/or configuration of rotor blades 22 is a darrieus wind turbine, sometimes referred to as an "eggbeater" turbine. Yet another example of another type, shape, and/or configuration of rotor blades 22 is a savonious wind turbine. Even another example of another type, shape, and/or configuration of rotor blades 22 is a traditional windmill for pumping water, such as, but not limited to, four-bladed rotors having wooden shutters and/or fabric sails. Moreover, wind turbine 10 may, in some embodiments, be a wind turbine wherein rotor 14 generally faces upwind to harness wind power, and/or may be a wind turbine wherein rotor 14 generally faces downwind to harness energy. Of course, in any embodiments, rotor 14 may not face exactly upwind and/or downwind, but may face generally at any angle (which may be variable) with respect to a direction of the wind to harness energy therefrom.

Figure 2:
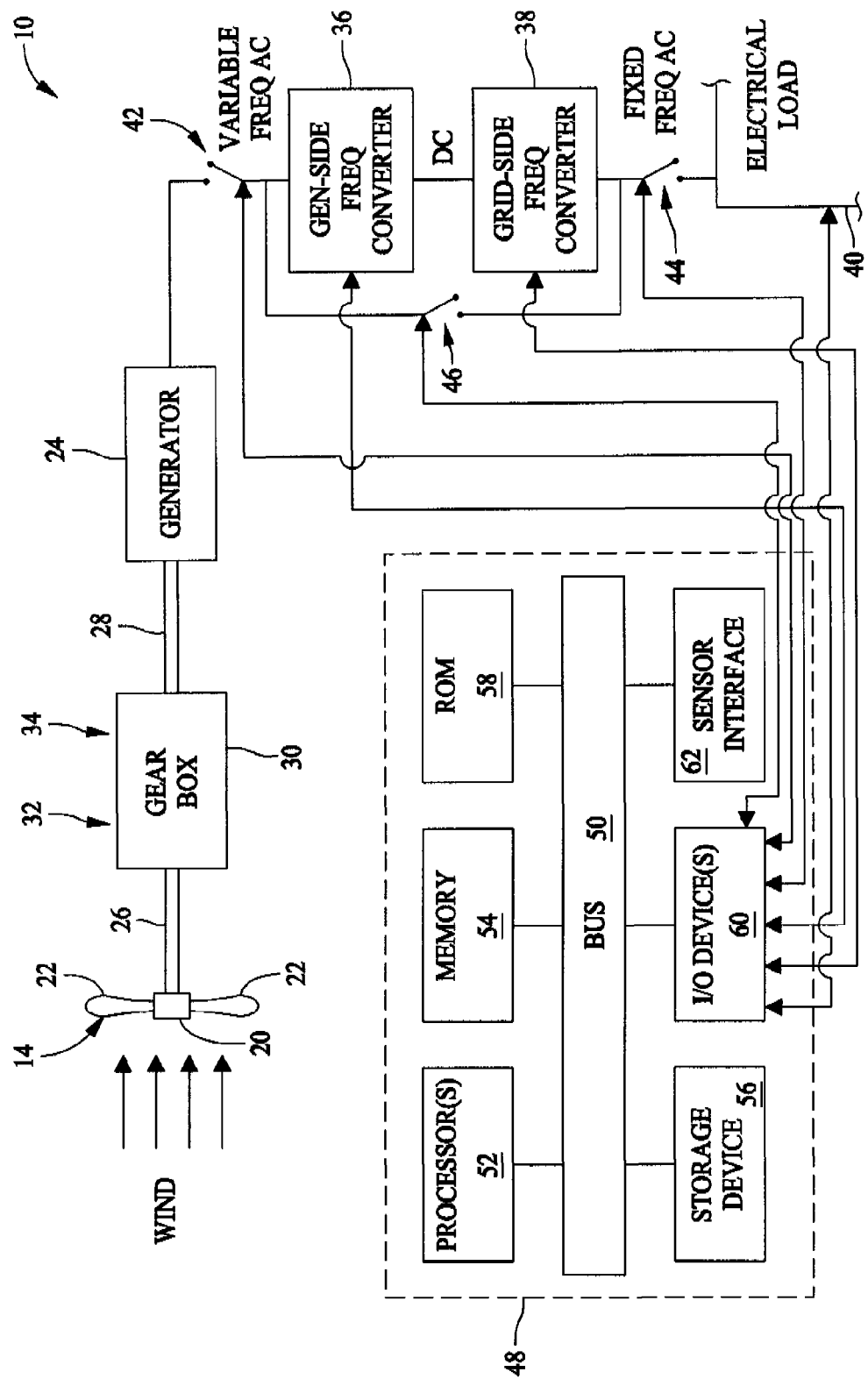
FIG. 2 is a schematic diagram of the wind turbine shown in FIGS. 1 and 2.

Referring now to FIG. 2, wind turbine 10 includes an electrical generator 24 coupled to rotor 14 for generating electrical power from the rotational energy generated by rotor 14. Generator 24 may be any suitable type of electrical generator, such as, but not limited to, a wound rotor induction generator, a permanent magnet generator, a synchronous generator, and/or a squirrel cage induction generator. Generator 24 includes a stator (not shown) and a rotor (not shown). Rotor 14 includes a rotor shaft 26 coupled to rotor hub 20 for rotation therewith. Generator 24 is coupled to rotor shaft 26 such that rotation of rotor shaft 26 drives rotation of the generator rotor, and therefore operation of generator 24. In the exemplary embodiment, the generator rotor has a rotor shaft 28 coupled thereto and coupled to rotor shaft 26 such that rotation of rotor shaft 26 drives rotation of the generator rotor. In other embodiments, the generator rotor is directly coupled to rotor shaft 26, sometimes referred to as a "direct-drive wind turbine". In the exemplary embodiment, generator rotor shaft 28 is coupled to rotor shaft 26 through a gearbox 30, although in other embodiments generator rotor shaft 28 is coupled directly to rotor shaft 26. More specifically, in the exemplary embodiment gearbox 30 has a low speed side 32 coupled to rotor shaft 26 and a high speed side 34 coupled to generator rotor shaft 28. The torque of rotor 14 drives the generator rotor to thereby generate variable frequency AC electrical power from rotation of rotor 14.

In the exemplary embodiment, wind turbine 10 includes a generator-side frequency converter 36 and a grid-side frequency converter 38, sometimes referred to as a double-conversion wind turbine generator. More specifically, generator-side frequency converter 36 is electrically coupled to generator 24 and converts variable frequency AC received from generator 24 to DC. Grid-side frequency converter 38 is electrically coupled to generator-side frequency converter 36 and converts DC received from generator-side frequency converter 36 to fixed frequency AC. Grid-side frequency converter 38 is also electrically coupled to an electrical load 40, such as, but not limited to, a power grid, an energy storage device, a hydrogen electrolyzer, and/or an electrical motor. During conditions wherein wind power is sufficient to drive rotation of rotor 14 and thereby generate electrical power from operation of generator 24, grid-side frequency converter 38 supplies fixed frequency AC to load 40. Grid-side frequency converter 38 may also absorb and/or supply electrical reactive power from load 40. Generator-side frequency converter 36 and grid-side frequency converter 38 may each be located anywhere within or remote to wind turbine 10. For example, in the exemplary embodiment, generator-side frequency converter 36 and grid-side frequency converter 38 are each located within a base (not shown) of tower 18.

As discussed above, grid-side frequency converter 38 is electrically coupled to electrical load 40 for supplying electrical reactive power thereto and for absorbing electrical reactive power therefrom. Additionally, generator-side frequency converter 36 is electrically coupled to electrical load 40 for supplying electrical reactive power thereto and for absorbing electrical reactive power therefrom. As such, both grid-side frequency converter 38 and generator-side frequency converter 36 are configured to supply reactive power to electrical load 40 and to absorb reactive electrical power from electrical load 40 when wind power is below a predetermined threshold, or when it is desired to supplement supply or absorption of reactive power by grid-side frequency converter 38 during operation of generator 24 using generator-side frequency converter 36. The predetermined threshold may have any value. For example, the predetermined wind power threshold may be a threshold value for when wind power is not sufficient to drive rotation of rotor 14 and is thereby not sufficient to operate electrical generator 24 to generate electrical power. Accordingly, both grid-side frequency converter 38 and generator-side frequency converter 36 can be used to supply reactive power to, and/or absorb reactive power from, electrical load 40 when wind power is insufficient to generate electrical power using electrical generator 24. For example, reactive power may be supplied to, and/or absorbed from, electrical load 40 to facilitate regulating a voltage of electrical load 40. In other embodiments, the predetermined threshold may be selected as a value at which wind power is sufficient to drive rotation of rotor 14 and thereby generate electrical power using generator 24, but at which it is desirable to supplement the reactive power generated by grid-side frequency converter 38 with the reactive power generated by generator-side frequency converter 36.

Generator-side frequency converter 36 and grid-side frequency converter 38 may be electrically coupled to electrical load in any manner, fashion, configuration, and/or arrangement, and/or using any structure, and/or means that enable them to function as described and/or illustrated herein. For example, in the exemplary embodiment, generator-side frequency converter 36 and grid-side frequency converter 38 are coupled to electrical load 40 in parallel, as shown in FIG. 2. Moreover, in the exemplary embodiment, a switch 42 electrically coupled along the electrical connection between generator 24 and generator-side frequency converter, and a switch 46 is electrically coupled along the electrical connection between generator-side converter 36 and electrical load 40. Switch 42 can be opened to electrically isolate generator-side frequency converter 36, and consequently grid-side frequency converter 38, from generator 24. When switch 42 is closed, electrical power can flow between generator 24 and generator-side frequency converter 36. In some embodiments, a switch 44 is electrically coupled along the electrical connection between grid-side frequency converter 38 and electrical load 40. Switch 44 can be opened to electrically isolate grid-side frequency converter 38, and consequently generator-side frequency converter 36, from electrical load 40. When switch 44 is closed, electrical power can flow between electrical load 40 and grid-side frequency converter 36. In other embodiments, switch 44 is not included. Switch 46 can be opened to electrically isolate generator-side frequency converter 36 from electrical load 40. When switch 46 is closed (and switch 44, when included, is closed), electrical power can flow between electrical load 40 and generator-side frequency converter 36. When wind power is below the predetermined threshold, generator-side frequency converter 36 and grid-side frequency converter 38 can be used to supply reactive power to, and/or absorb reactive power from, electrical load 40 by opening, or maintaining open, switch 42 and by closing, or maintaining closed, switch 46 (and switch 44, when included). Switches 42 and 46 (and 44, when included), may be any suitable switch, such as, but not limited to, a power electronic device, a contactors, an interrupter, and/or a circuit breaker.

In some embodiments, wind turbine 10 may include one or more control systems 48 coupled to one or more components of wind turbine 10 for generally controlling operation of wind turbine 10 and/or as some or all of the components thereof (whether such components are described and/or illustrated herein). In the exemplary embodiment, control system(s) 48 is mounted within nacelle 12. However, additionally or alternatively, one or more control systems 48 may be remote from nacelle 12 and/or other components of wind turbine 10. Control system(s) 48 may be used for, but is not limited to, overall system monitoring and control including, for example, but not limited to, pitch and speed regulation, high-speed shaft and yaw brake application, yaw and pump motor application, and/or fault monitoring. Alternative distributed or centralized control architectures may be used in some embodiments.

As shown in FIG. 2, in the exemplary embodiment, control system(s) 48 include a bus 50 or other communications device to communicate information. One or more processor(s) 52 are coupled to bus 50 to process information. Control system(s) 48 may also include one or more random access memories (RAM) 54 and/or other storage device(s) 56. RAM(s) 54 and storage device(s) 56 are coupled to bus 50 to store and transfer information and instructions to be executed by processor(s) 52. RAM(s) 54 (and/or also storage device(s) 56, if included) can also be used to store temporary variables or other intermediate information during execution of instructions by processor(s) 52. Control system(s) 48 may also include one or more read only memories (ROM) 58 and/or other static storage devices coupled to bus 50 to store and provide static (i.e., non-changing) information and instructions to processor(s) 52. Input/output device(s) 60 may include any device known in the art to provide input data to control system(s) 48, such as, but not limited to, input data relating to electrical load 40, and/or to provide outputs, such as, but not limited to, yaw control outputs, pitch control outputs, and/or switch control outputs for controlling operation of switches 42, 44, and/or 46. Instructions may be provided to memory from a storage device, such as, but not limited to, a magnetic disk, a read-only memory (ROM) integrated circuit, CD-ROM, and/or DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions, whether described and/or illustrated herein.

Control system(s) 48 may also include a sensor interface 62 that allows control system(s) 48 to communicate with any sensors. Sensor interface 62 can be or can include, for example, one or more analog-to-digital converters that convert analog signals into digital signals that can be used by processor(s) 52. Control system(s) 48 may coupled, such as, but not limited to, electrically and/or optically, to both generator-side frequency converter 36 and grid-side frequency converter 38 for controlling operation thereof to supply electrical, such as, but not limited to reactive, power to electrical load 40, and/or absorb electrical, such as, but not limited to, reactive, power from electrical load 40. In the exemplary embodiment, control system(s) 48 is electrically coupled to converters 36 and 38 as well as switches 42 and 46 (and 44, when included) for controlling operation thereof. In some embodiments, control system(s) 48 is coupled, such as, but not limited to, electrically and/or optically, to electrical load 40 for receiving information relating to load 40, such as, but not limited to operational parameters and/or conditions of load 40, and/or for controlling operation of load 40. For example, in some embodiments, control system(s) 48 receives voltage information or other information relating to load 40 for regulating a voltage of load 40 using converters 36 and/or 38, whether such information be received from a direct connection between control system(s) 48 and load 40, as in the exemplary embodiment, and/or from a sensor (not shown) through sensor interface 62.

In addition or alternative to control system(s) 48, other control system(s) (not shown) may be used to control operation of load 40 and/or to control operation of converters 36 and/or 38 to supply electrical, such as, but not limited to reactive, power to electrical load 40, and/or absorb electrical, such as, but not limited to reactive, power from electrical load 40. Such other control system(s) include, but are not limited to, one or more control systems associated with other wind turbines (not shown), one or more centralized control systems for a wind farm, and/or one or more control systems associated with load 40.

Figure 3:
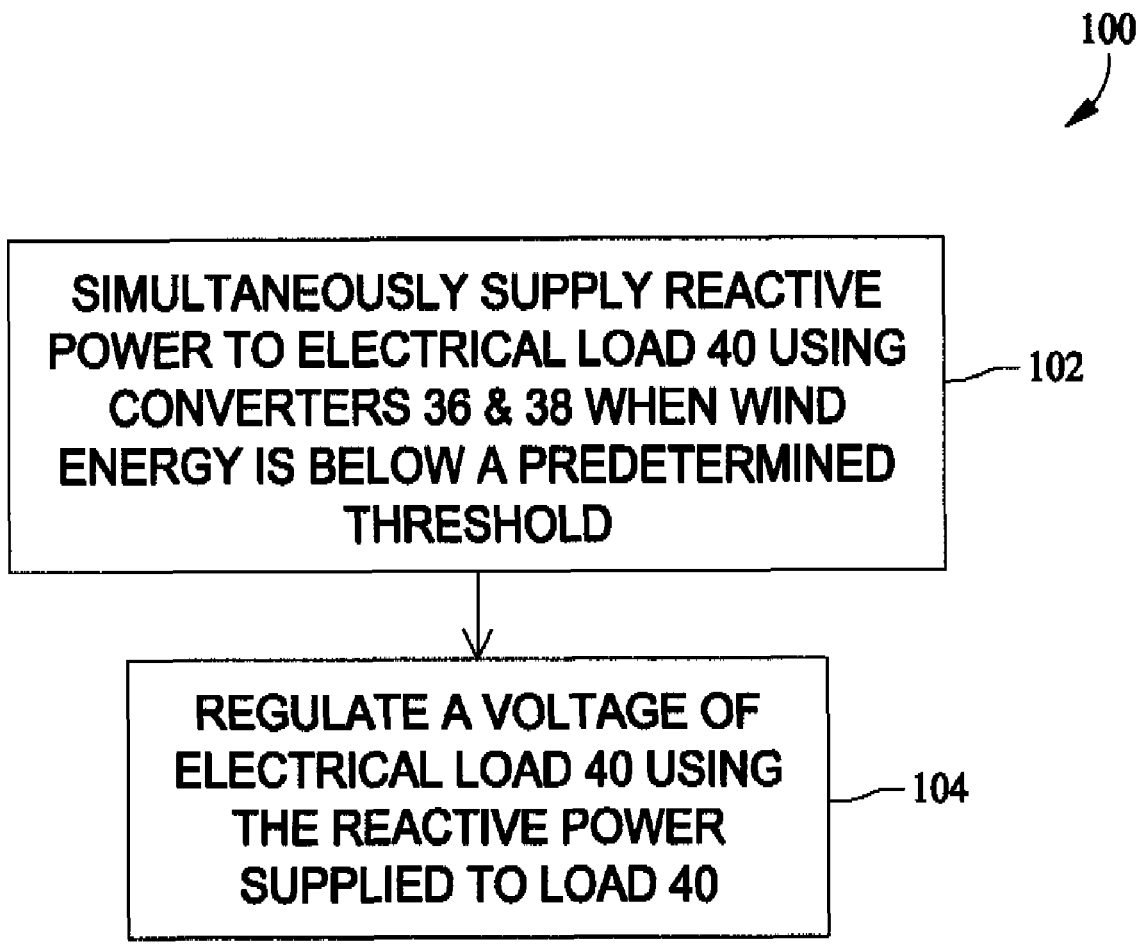
FIG. 3 is a flowchart illustrating an exemplary embodiment of a method for providing reactive power with respect to a wind turbine, such as, but not limited to, the wind turbine shown in FIGS. 1 and 2.

FIG. 3 is a flowchart illustrating an exemplary embodiment of a method 100 for providing reactive power with respect to a wind turbine, such as, but not limited to, wind turbine 10 (shown in FIGS. 1 and 2). Although method 100 will be described and illustrated herein with respect to wind turbine 10, method 100 is applicable to any wind generator. Method 100 includes simultaneously supplying 102 reactive power to electrical load 40 (shown in FIG. 2) using generator-side frequency converter 36 (shown in FIG. 2) and grid-side frequency converter 38 (shown in FIG. 2) when wind power is below the predetermined threshold discussed above with regard to FIG. 2, or when it is desired to supplement supply of reactive power by grid-side frequency converter 38 during operation of generator 24 using reactive power from generator-side frequency converter 36. In some embodiments, control system(s) 48 (shown in FIG. 2) and/or other control systems, such as, but not limited to, one or more control systems associated with other wind turbines (not shown), one or more centralized control systems for a wind farm, and/or one or more control systems associated with load 40 may be used to facilitate supplying 102 reactive power to load 40.

Although method 100 may supply 102 reactive power to load 40 in any manner, fashion, configuration, and/or arrangement, and/or using any method, process, structure, and/or means, in the exemplary embodiment, method 100 includes electrically isolating generator-side frequency converter 36 from generator 24 (shown in FIG. 2) by opening, or maintaining open, switch 42 (shown in FIG. 2). Switch 46 (shown in FIG. 2), and switch 44 (shown in FIG. 2) if included, are closed, or maintained closed, to supply reactive power to load 40. In some embodiments, the reactive power supplied to electrical load 40 is used to facilitate regulating 104 a voltage of electrical load 40.

Figure 4:
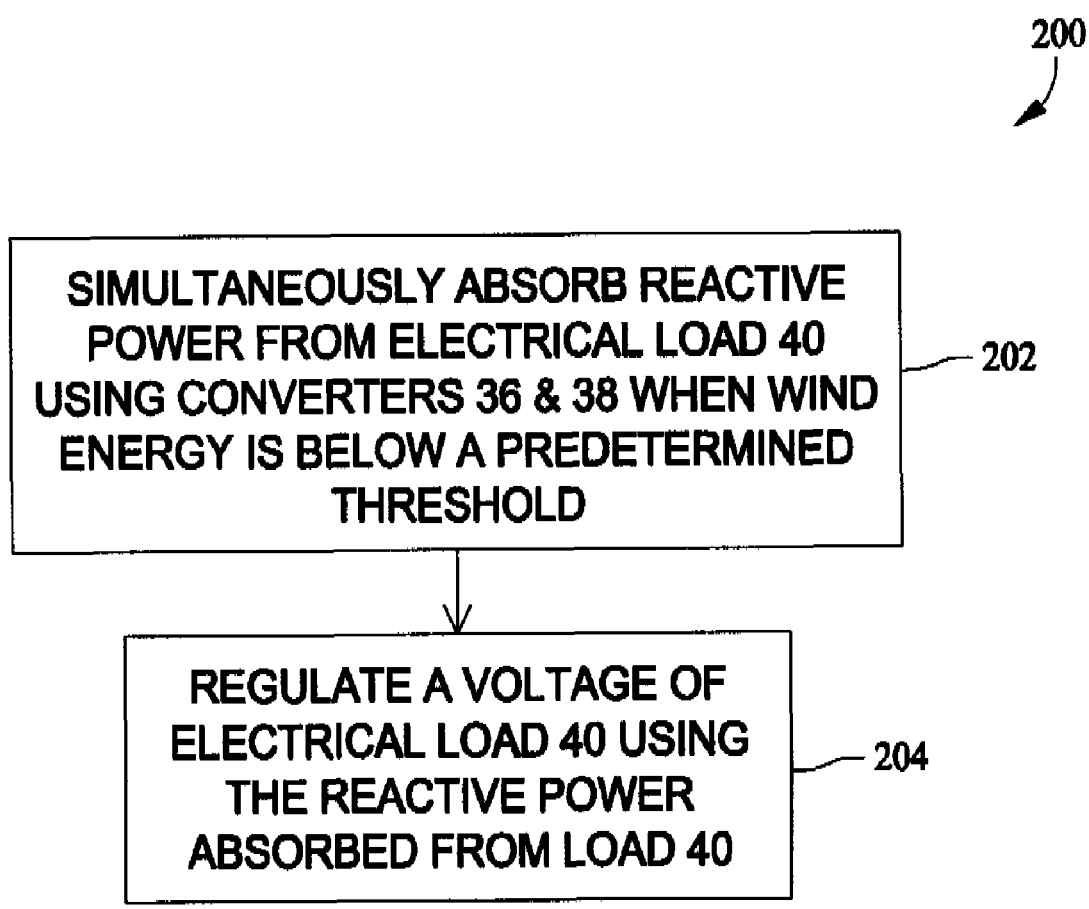
FIG. 4 is a flowchart illustrating another exemplary embodiment of a method for providing reactive power with respect to a wind turbine, such as, but not limited to, the wind turbine shown in FIGS. 1 and 2.

FIG. 4 is a flowchart illustrating another exemplary embodiment of a method 200 for providing reactive power with respect to a wind turbine, such as, but not limited to, wind turbine 10 (shown in FIGS. 1 and 2). Although method 200 will be described and illustrated herein with respect to wind turbine 10, method 200 is applicable to any wind generator. Method 200 includes simultaneously absorbing 202 reactive power from electrical load 40 (shown in FIG. 2) using generator-side frequency converter 36 (shown in FIG. 2) and grid-side frequency converter 38 (shown in FIG. 2) when wind power is below the predetermined threshold discussed above with regard to FIG. 2, or when it is desired to supplement absorption of reactive power by grid-side frequency converter 38 during operation of generator 24 using generator-side frequency converter 36. In some embodiments, control system(s) 48 (shown in FIG. 2) and/or other control systems, such as, but not limited to, one or more control systems associated with other wind turbines (not shown), one or more centralized control systems for a wind farm, and/or one or more control systems associated with load 40 may be used to facilitate absorbing 202 reactive power from load 40.

Although method 200 may absorb 202 reactive power from load 40 in any manner, fashion, configuration, and/or arrangement, and/or using any method, process, structure, and/or means, in the exemplary embodiment, method 200 includes electrically isolating generator-side frequency converter 36 from generator 24 (shown in FIG. 2) by opening, or maintaining open, switch 42 (shown in FIG. 2). Switch 46 (shown in FIG. 2), and switch 44 (shown in FIG. 2) when included, are closed, or maintained closed, to absorb reactive power from load 40. In some embodiments, the reactive power absorbed from electrical load 40 is used to facilitate regulating 204 a voltage of electrical load 40.

Exemplary embodiments are described and/or illustrated herein in detail. The embodiments are not limited to the specific embodiments described herein, but rather, components and steps of each embodiment may be utilized independently and separately from other components and steps described herein. Each component, and each step, can also be used in combination with other components and/or method steps.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A wind turbine comprising:
a rotor comprising a hub, at least one rotor blade coupled to said hub, and a rotor shaft coupled to said hub for rotation therewith;
an electrical generator coupled to said rotor shaft;
a generator-side frequency converter electrically coupled to said electrical generator for converting variable frequency AC received from said electrical generator into DC, said generator-side frequency converter electrically coupled to an electrical load and configured to at least one of supply reactive power to the electrical load and absorb reactive power from the electrical load;
a grid-side frequency converter electrically coupled to said generator-side frequency converter for converting DC received from said generator-side frequency converter into fixed frequency AC, said grid-side frequency converter electrically coupled to the electrical load and configured to at least one of supply reactive power to the electrical load or absorb reactive power from the electrical load.

2. A wind turbine in accordance with claim 1 wherein said generator-side frequency converter and said grid-side frequency converter are electrically coupled to the electrical load in parallel.

3. A wind turbine in accordance with claim 1 further comprising a switch electrically coupled along the electrical connection between said electrical generator and said generator-side frequency converter for selectively electrically isolating said electrical generator from said generator-side frequency converter.

4. A wind turbine in accordance with claim 1 further comprising a switch electrically coupled along the electrical connection between the electrical load and said generator-side frequency converter for selectively electrically isolating the electrical load from said generator-side frequency converter.

5. A wind turbine in accordance with claim 1 further comprising a processor coupled to said generator-side frequency converter and said grid-side frequency converter.

6. A wind turbine in accordance with claim 5 wherein said processor is configured to simultaneously supply the electrical load with reactive power from said generator-side frequency converter and said grid-side frequency converter.

7. A wind turbine in accordance with claim 5 wherein said processor is configured to simultaneously absorb reactive power from the electrical load using said generator-side frequency converter and said grid-side frequency converter.

8. A wind turbine in accordance with claim 5 wherein said processor is coupled to the electrical load and is configured to regulate a voltage of the electrical load using said generator-side frequency converter and said grid-side frequency converter.

9. A wind turbine in accordance with claim 1 wherein the electrical load is a power grid.

10. A method for providing reactive power with respect to a wind turbine having an electrical generator, a generator-side frequency converter electrically coupled to the electrical generator, and a grid-side frequency converter electrically coupled between the generator-side frequency converter and an electrical load, said method comprising simultaneously supplying reactive power to the electrical load using the generator-side frequency converter and the grid-side frequency converter.

11. A method in accordance with claim 10 wherein said simultaneously supplying reactive power to the electrical load comprises simultaneously supplying reactive power to the electrical load when wind power is below a predetermined threshold or to supplement supply of reactive power by the grid-side frequency converter during operation of the electrical generator using the generator-side frequency converter.

12. A method in accordance with claim 10 wherein said simultaneously supplying reactive power to the electrical load comprises simultaneously supplying reactive power to a power grid.

13. A method in accordance with claim 10 wherein said simultaneously supplying reactive power to the electrical load using the generator-side frequency converter and the grid-side frequency converter comprises supplying reactive power to the electrical load from the generator-side and grid-side frequency converters in parallel.

14. A method in accordance with claim 10 wherein the electrical load is a power grid and wherein said simultaneously supplying reactive power to the electrical load comprises regulating a voltage of the power grid.

15. A method in accordance with claim 10 further comprising electrically isolating the generator-side frequency converter from the electrical generator.

16. A method for providing reactive power with respect to a wind turbine having an electrical generator, a generator-side frequency converter electrically coupled to the electrical generator, and a grid-side frequency converter electrically coupled between the generator-side frequency converter and an electrical load, said method comprising simultaneously absorbing reactive power from the electrical load using the generator-side frequency converter and the grid-side frequency converter.

17. A method in accordance with claim 16 wherein said simultaneously absorbing reactive power from the electrical load comprises simultaneously absorbing reactive power from the electrical load when wind power is below a predetermined threshold or to supplement supply of reactive power by the grid-side frequency converter during operation of the electrical generator using the generator-side frequency converter.

18. A method in accordance with claim 16 wherein said simultaneously absorbing reactive power from the electrical load comprises simultaneously absorbing reactive power from a power grid.

19. A method in accordance with claim 16 wherein said simultaneously absorbing reactive power from the electrical load using the generator-side frequency converter and the grid-side frequency converter comprises absorbing reactive power from the electrical load using the generator-side and grid-side frequency converters in parallel.

20. A method in accordance with claim 16 wherein the electrical load is a power grid and wherein said simultaneously absorbing reactive power from the electrical load comprises regulating a voltage of the power grid.

21. A method in accordance with claim 16 further comprising electrically isolating the generator-side frequency converter from the electrical generator.

* * * * *